Dec. 17, 1968 W. W. WEISMAN 3,416,529
THERAPEUTIC AND SERVICE DEVICE
Filed Sept. 23, 1965 2 Sheets-Sheet 1
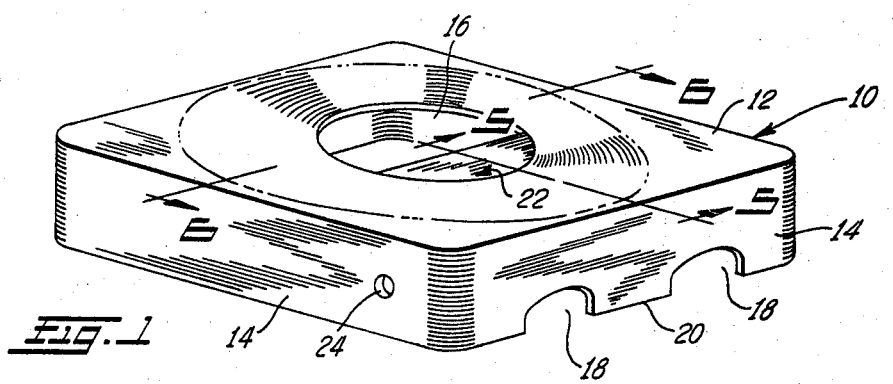
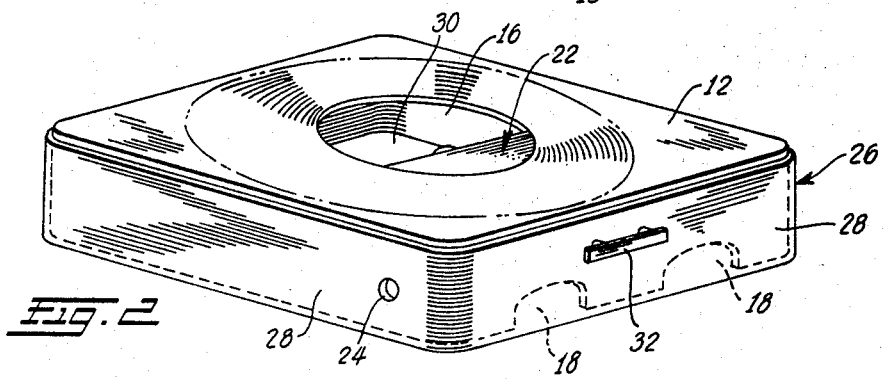
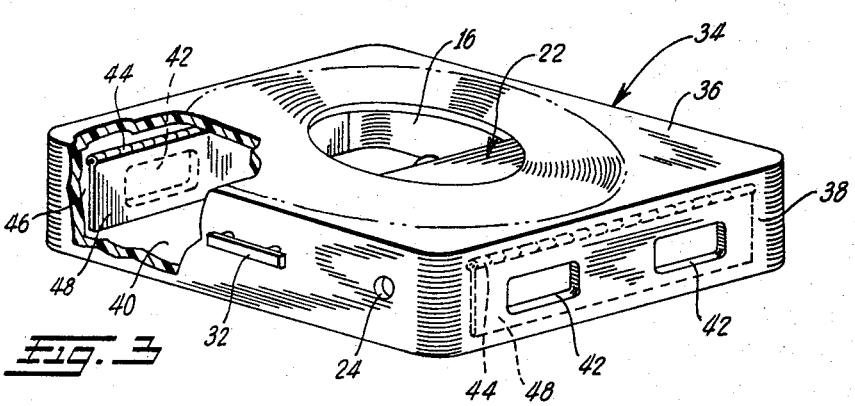
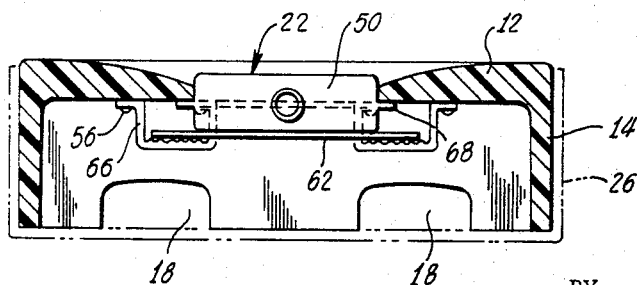
INVENTOR
William W. Weisman
BY Kramer & Sturges
ATTORNEYS Dec. 17, 1968 W. W. WEISMAN 3,416,529
THERAPEUTIC AND SERVICE DEVICE
Filed Sept. 23, 1965 2 Sheets-Sheet 2

INVENTOR
William W. Weisman
BY Kramer & Sturges
ATTORNEYS

United States Patent Office

3,416,529
Patented Dec. 17, 1968

3,416,529
THERAPEUTIC AND SERVICE DEVICE
William W. Weisman, 307 N. Dixie, West Palm
Beach, Fla. 33401
Filed Sept. 23, 1965, Ser. No. 489,549
15 Claims. (Cl. 128—232)

ABSTRACT OF THE DISCLOSURE

A device utilized by individuals when bathing or therapeutically treating the perineal and anal regions of the body. The device comprises a seat with an opening for receiving the perineal and anal regions of the human body, and includes a support in the opening for engaging and holding the genitals of a male human body out of contact with fluid medium circulating under the opening in the seat.

Background of the invention

This invention relates to a therapeutic device and generally such a device which is adaptable to also function as a service device. More specifically, this invention is directed to apparatus for bathing and rending therapy to the perineal and anal regions of the human body and that contains supporting means for certain portions of the human body which is adaptable to also function as a service device for both males and females.

Bathing devices for the perineal and anal portions of the human body, called sitz baths, are well known. Often, however, persons that wish to use such a device may have injured portions of the body which should not be subjected to the moisture, heat or medicinal medium coincident with the bath.

It is therefore an object of this invention to provide a device for the bathing and therapy of portions of the human body and including supporting means for the genital region of the human body.

A further object of this invention is the provision of a device for the bathing and therapy of certain portions of the human body, such device being adaptable for use with its own container for the bathing and therapy medium or with other containers, such as a bathtub.

Another object of this invention is the provision of a device for the bathing and therapy of certain portions of the human body, such device having an integrally formed container for the bathing and therapy medium or can be used with other containers, such as a bathtub.

The device for the bathing and therapy of certain portions of the human body which contains supporting means for the genital region of the human body and forms this invention is also adaptable so that such supporting means can be used as a service device for females or a service device for both males and females.

These and other objects will become apparent upon a reading of the following detailed description taken in conjunction with the drawings which illustrate:

FIGURE 1 is a perspective view of the base member of the device of this invention;

FIGURE 2 is a perspective view of the base member of FIGURE 1 placed in the container for holding the bathing and therapy medium;

FIGURE 3 is a perspective view, partially broken away, of an integral base and container of this invention;

FIGURE 6 is an enlarged cross sectional view along line 6—6 of FIGURE 1;

Figure 4:
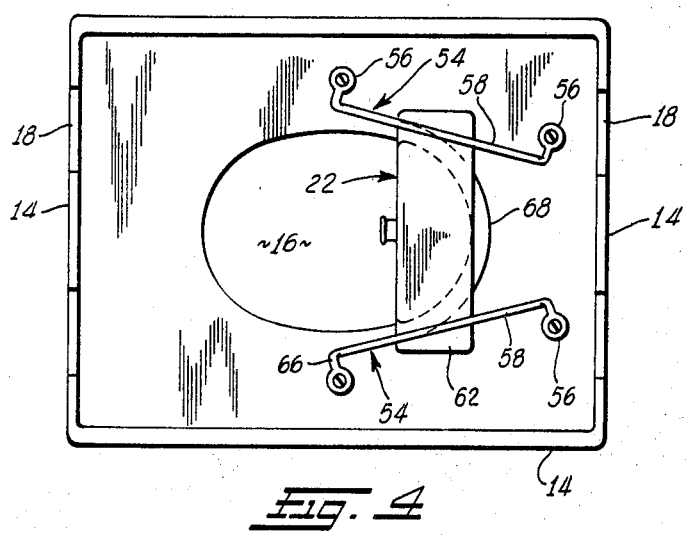
FIGURE 4 is a bottom plan view of the bathing and therapy device of this invention, showing the support members and container forming the support for the genital region of the human body or a service device.
Figure 5:
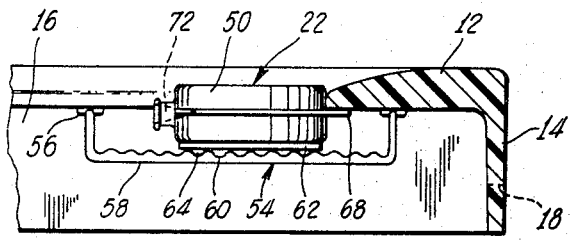
FIGURE 5 is an enlarged cross sectional view along line 5—5 of FIGURE 1.
Figure 7:
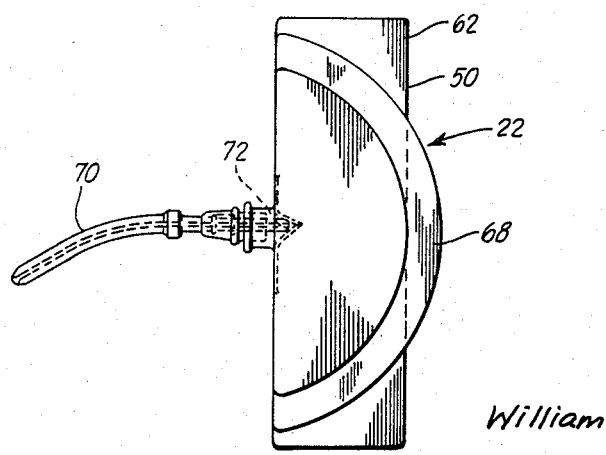
FIGURE 7 is a plan view of the cross support and container forming the support for the genital region of the human body or service device.

Attention is now directed to FIGURE 1 which discloses the base member 10 of the novel combination therapeutic and service device of this invention. The base member 10 is substantially rectangular in configuration and contains a top portion 12 and side portions 14. The side portions 14 are of sufficient height to dispose the top portion 12 of base member 10 substantially above the fluid medium of the therapeutic and service device, as will become apparent hereinafter.

The top portion 12 of the base member 10 contains a substantially oval shaped opening 16 for receipt of the anal region of the human body so that such will be disposed within the bathing and therapy fluid medium.

The forward and rearward side portions 14 of the base member 10 each contain openings 18 extending upwardly from the lower edge 20 of those side members. The openings 18 facilitate circulation of the bathing and therapy fluid medium into the area of base member 10 adjacent opening 16.

The base member 10 also includes a support 22 disposed across the opening 16 adjacent the forward portion of the opening. The support 22 is so positioned with respect to the opening 16 to support portions of the human body such as the genital region of the male which may be injured and thus should not be subjected to the moisture, heat or medicinal medium coincident with the fluid medium.

The base member 10 can be placed in a bathtub, for example, or any other conventional container for holding the bathing or therapeutic medium used as the bath. With the base member 10 so disposed, the fluid medium will circulate through openings 18 into the internal portion of the base member and adjacent the opening 16. The user of this bathing or therapeutic device will be positioned with the anal region in opening 16 and such region of the body immersed in the fluid medium. In the event the user has an injured genital region, for example, the support 22 carries that region of the body so that such is free from the heat and moisture, etc., coincident with the fluid medium of the bath.

The base member can be made from any conventional lightweight, non-corrosive material such as plastic, fiber glass, aluminum, etc. Further, the base member 10 can be provided with any desirable shape so long as it sufficiently supports the user at the desired level with respect to the fluid medium and contains an opening which is somewhat contoured to the usual shape of anal region of a typical user to facilitate comfort.

The base member 10 can also be provided with an opening at 24 for insertion of a thermal or electrical element to enhance the therapeutic effect of the fluid medium of the device.

In addition to the base member being adaptable for use with the conventional containers for bathing and therapy fluid mediums as described above, such can also be used with a separate container as at 26 having substantially the same configuration as the base member, as shown in FIGURE 2. The container 26, as shown, has side portions 28 and a base portion 30 which are shaped to the general contour of base member 10 and which form a fluid tight container. With the base member and container being so positioned, the bathing and therapy fluid medium can be placed in the container and the user can obtain the aforementioned advantages coincident with the base member 10. Also, the container 26 can be made from any lightweight, non-corrosive material, and contain an opening 24 for receipt of thermal, electrical or other means to aid the therapeutic effect of the fluid medium disposed in container 26. Container 26 can be provided with a handle as illustrated at 32 to aid the user in transporting the entire device.

The base member and container of this invention can also be formed integrally so that such can function as a bathing and therapy device or be used with any conventional container. This form of the invention is illustrated in FIGURE 3 and as shown, comprises a combination base and container 34 having a top portion 36, side portions 38 and bottom portion 40 forming a fluid tight enclosure for containing the fluid bathing and therapy medium. The top portion 36 contains an opening 16 for receipt of the anal region of the user in the same manner as described in connection with FIGURES 1 and 2. Further, the top portion 36 is provided with a support 22 for supporting the genital region of the human body in the same manner as described in conjunction with FIGURES 1 and 2.

In order for the base and container 34 to be readily adaptable for retaining the fluid medium or placement in a separate container, such as a bathtub, which would contain the fluid medium, the forward and rearward side portions 38 are provided with openings 42. Hinged at 44 to the inside faces 46 of the side portions are plates 48. The sides of the plates 48 are in sealing relation to the inside faces 46 when the integral base and container are used independently and filled to the desired level with the fluid medium. The fluid medium can be placed in the base and container 34 and through the mentioned sealing relation of plates 48 and side portions 38, a fluid tight enclosure is formed. The fluid medium of the bath within base container 34 presses the plates 48 against the side portions 38 to effect a pressure type seal. When, however, it is desired to use the base container 34 in a separate conventional container, the fluid medium in that container will pass into openings 42 and force plates 48 away from the side portions 38 so that the fluid medium can circulate through the base container 34 in the region of the opening 16. In this manner, an integral base container is provided which can be used to contain the bathing and therapy fluid medium or be used with a separate container holding such fluid medium.

The base container 34 can also be provided with a handle as at 32 to facilitate the user transporting the entire device. Additionally, one or more of the sides 38 can be provided with an opening 24 for receipt of thermal or electrical elements to aid in the therapeutic effect of the fluid medium. The base container 34 can be formed of any lightweight, non-corrosive material in the same manner as described in connection with FIGURES 1 and 2.

Additionally, in regard to the devices of FIGURES 2 and 3, such are also readily adaptable for use as a bedpan, having the additional advantage of support 22 to keep those parts of the users body in the genital region free from the foreign matter that would be deposited within the container.

Attention is now directed to FIGURES 4 to 7 wherein there is disclosed the above described bathing and therapy device in combination with the service device of this invention.

The base member 10 of this form of the invention also includes a top portion 12, side portions 14, and an opening 16 in the top portion 12. Additionally, openings 18 are also provided for sufficient circulation of the fluid medium into the area adjacent opening 16 as hereinbefore described or passage of foreign matter away from the area adjacent opening 16, as will become apparent hereinafter.

The therapeutic and bathing device described in connection with FIGURES 1 and 2 can be combined with a service device through provision of a support 22 for the genital region of the body that is of a container type as at 50. The container 50 extends across the opening 16 adjacent the forward portion of the opening so as to function as a support for the genital region of the body in the manner hereinbefore described. Additionally, the container by being so positioned, enables the device to function as a bidet or a device for giving enemas as will become apparent hereinafter.

A pair of tracks 54 are carried on the underside of the top portion 12. Each of the tracks 54 comprise a pair of plates 56 secured by any conventional means to the underside of top portion 12. The plates 56 carry a U-shaped member 58 which supports the support and service member 22. Extending between tracks 54 is a cross support 62 which carries member 22. The cross support 62 contains a corrugated under surface 64 cooperating with a similar corrugated surface 60 on tracks 54.

The tracks 54 are of greater length than the width of cross support 62 so that the cross support 62 and member 22 can be adjusted forwardly or rearwardly with respect to opening 16 rendering greater flexibility in the utility of member 22. The cooperating surfaces 60 and 64 of tracks 54 and cross support 62, respectively, cooperate to retain the cross support 62 and thus member 22 in an adjusted position.

The rearward leg 66 of the U-shaped member 58 is curved outwardly, as shown in FIGURE 4, toward the sides of the device to facilitate insertion and removal of cross support 62 and member 22.

The container 50 is formed of resilient material such as plastic, rubber, etc. and is adapted to be filled with a cleansing or therapeutic fluid for functioning as an enema or douche. The side edges 68 of the container 50 are formed of firmer material than the main portion of the container or can be made firm by pressing or heat treating the container in that area. The container is carried on cross support 62 with the edges 68 thereof positioned against the underside of top 12 adjacent the periphery of opening 16. In this manner, container 50 is securely positioned when used either as a support for the genital region of the body or filled with cleansing or therapeutic fluid when functioning as a service device.

From the above description it can be seen that the container 50 can be filled with cleansing or therapeutic fluid material and positioned with cross support 62 onto tracks 54. Thereafter, the user through the use of a conventional syringe as at 70 can position herself or himself with respect to opening 16 and by insertion of the syringe into the vaginal or anal region of the body introduce such fluid material and thereafter emit the desired foreign matter into any container used with the device.

The container 50 includes the conventionl one way flow imposing means 72, so that the desired cleansing or therapeutic fluid can be placed into the container without being emitted until insertion of the syringe 70.

It will thus be appreciated, the novel therapeutic and service device has universal use in that it contains a new and novel support for the genital region of the body which can also function as a service device for both males and females of all ages.

This invention has been illustrated in one preferred form, however, it is to be understood such is not limited to the specific embodiments illustrated, but includes any and all equivalent structures falling within the appended claims.

What is claimed is:

1. A therapeutic and bathing device adapted to be disposed in a bathing and therapeutic fluid medium comprising:
   a base member adapted to receive the perineal and anal regions of the human body;
   said base member comprising a top portion and side portions;
   said top portion having an opening the periphery of which has a configuration to accommodate the perineal and anal regions of the human body;
   said side portions being attached to said top portion so as to support the perineal and anal regions of the human body within said opening adjacent to and within the therapeutic and bathing fluid medium disposed within the interior of said device;

supporting means extending across a portion of said opening in said top portion for engaging and supporting the genitals of a male human body; and means for removably mounting the supporting means in extending relation across the portion of said opening.

2. A therapeutic and bathing device as defined in claim 1 wherein at least one of said side portions has openings extending upwardly from adjacent the lower edge of said one of said side portions to provide substantially free movement of the fluid medium to and from said opening in said top portion.

3. A therapeutic and bathing device as defined in claim 2 wherein more than one of said side portions is provided with said openings.

4. A therapeutic and bathing device as defined in claim 1 wherein at least one of said side portions is provided with a handle member so as to facilitate transporting said device from one location to another.

5. A therapeutic and bathing device as defined in claim 1 wherein at least one of said side portions has an opening adapted to receive a means aiding the therapeutic effect of the fluid medium.

6. A therapeutic and bathing device adapted to be disposed in a bathing and therapeutic fluid medium comprising:

a base member adapted to receive the perineal and anal regions of the human body;

said base member comprising a top portion and side portions;

said top portion having an opening the periphery of which has a configuration to accommodate the perineal and anal regions of the human body;

said side portions being attached to said top portion so as to support the perineal and anal regions of the human body within said opening adjacent to and within the therapeutic and bathing fluid medium disposed within the interior of said device;

supporting means extending across a portion of said opening in said top portion to support the genital region of the human body;

a container for holding the fluid medium comprising side and bottom members of substantially the same configuration as the side portions and top portion of said base member;

said base member being disposed in said container so that the fluid medium within said container is disposed adjacent said opening in said top portion.

7. A therapeutic and bathing device adapted to be disposed in a bathing and therapeutic fluid medium comprising:

an integral base and container member adapted to receive the perineal and anal regions of the human body;

said base and container member comprising a top portion, side portions and a bottom portion forming a fluid tight container for holding the fluid medium and a support for the perineal and anal regions of the human body;

said top portion having an opening the periphery of which has a configuration to accommodate the perineal and anal regions of the human body;

said side portions being attached to said top portion so as to support the perineal and anal regions of the human body within said opening adjacent to and within the therapeutic and bathing fluid medium disposed within the interior of said device;

supporting means extending across a portion of said opening in said top portion for engaging and supporting the genitals of a male human body; and means for removably mounting the supporting means in extending relation across the portion of said opening.

8. A therapeutic and bathing device as defined in claim 7 including means permitting use of said device as a container for holding the fluid medium and for use with a separate container.

9. A therapeutic and bathing device as defined in claim 8 wherein said means comprises an opening in at least one of said side portions and a plate carried on said one of said side portions adapted to seal said opening and permit the fluid medium to pass through said opening.

10. A therapeutic and bathing device as defined in claim 9 wherein said plate is hinged to the inside face of said one of said side portions.

11. A therapeutic and service device comprising:

a base member adapted to receive the perineal and anal regions of the human body;

said base member comprising a top portion and side portions;

said top portion having an opening the periphery of which has a configuration to accommodate the perineal and anal regions of the human body;

said side portions being attached to said top portion so as to support the perineal and anal regions of the human body adjacent to and within a therapeutic and bathing medium adapted to be disposed within the interior of said device;

a supporting means extending across a portion of said opening in said top portion to support the genital region of the human body;

said support means including a container adapted to receive a service fluid medium;

said container being expandable and having a syringe for insertion into portions of the human body enabling said supporting means to function as a service device for both males and females.

12. A therapeutic and service device as defined in claim 11 including track means disposed adjacent the forward portion of said opening in said top portion adapted to carry said supporting means.

13. A therapeutic and service device as defined in claim 12 wherein said track means and said supporting means each contain cooperating means for retaining said supporting means in a given position on said track means.

14. A therapeutic and service device as defined in claim 13 wherein said track means comprises a pair of track members each of which are disposed on opposed sides of said opening in said top portion and said supporting means includes a cross support extending between said track members for supporting said container.

15. A therapeutic and service device as defined in claim 11 wherein said container includes side portions cooperating with the underside of said top portion preventing upward movement of the entire container through said opening in said top portion.

References Cited

UNITED STATES PATENTS

| 1,685,693 | 9/1928  | Claus     | 128—231    |
| 1,818,489 | 8/1931  | Mabry     | 128—226 XR |
| 3,025,531 | 3/1962  | Baker     | 4—112      |
| 3,082,432 | 3/1963  | Pearlman  | 4—7        |
| 3,288,140 | 11/1966 | McCarthy  | 128—248    |

FOREIGN PATENTS

| 1,073,229 | 3/1954 | France.  |
| 375,005   | 5/1923 | Germany. |

RICHARD A. GAUDET, *Primary Examiner.*

RONALD L. FRINKS, *Assistant Examiner.*

U.S. Cl. X.R.

128—248, 254, 370; 4—6, 112